Patented Nov. 5, 1940

2,220,856

UNITED STATES PATENT OFFICE 2,220,856

PROCESS FOR RENDERING TEXTILES WATER-REPELLENT AND PRODUCTS THEREFROM

Ernst Waltmann, Krefeld, Germany, assignor to Heberlein Patent Corporation, New York, N. Y., a corporation of New York No Drawing. Application July 17, 1937, Serial No. 154,198. In Germany March 31, 1936

10 Claims. (Cl. 8—116)

This invention relates to processes for producing water-repelling fibrous materials and products derived therefrom and to the production of reagents for treating said materials to produce water-repellence. It also includes processes for making chemicals for water-repellence and products therefrom. This application is a continuation in part of application Serial No. 133,904, filed March 30, 1937.

The principal object of the present invention is to provide a simple process to increase the water-repellence and resistance to drop-spotting of textile materials; and to provide a series of useful textiles having such properties. Another object is to provide a simple efficient process for making chemicals useful for treating textiles to produce such properties and to provide a series of such chemical products.

The invention comprises the novel products as well as the novel processes and steps of processes according to which such products are manufactured, the specific embodiments of which are described hereinafter by way of example and in accordance with which I now prefer to practice the invention.

I have found in accordance with my invention that thiocyano methyl ethers of high molecular weight of the general formula $ROCH_2.(SCN)$ may be used for ennobling textiles, and particularly for giving them the properties mentioned as an object above. In the formula the letter R designates an alkyl, cyclo-alkyl or aralkyl radical, containing an alkyl radical of at least 10 carbon atoms, or R may be a saturated or unsaturated radical of an alcohol of the sterol series. When I refer in the claims to a sterol radical I mean a radical derived from cholesterin or similar alcohol of the sterol series which may be generally designated by the formula $R_2OH$ in which $R_2$ may be saturated or unsaturated and may be represented for example by $C_{27}H_{45}$. In the general formula above given R may thus mean specifically $C_{27}H_{45}$. I have found that the designated thiocyano methyl ethers can be prepared by reaction of the chloromethyl ether of a higher fatty alcohol, which will supply the radical R required above, with a salt of sulphocyanic acid. The reaction produces the thiocyano methyl ether containing the desired radical mentioned in accordance with the following equation:

$$R.O.CH_2.Cl + K.(SCN) \rightarrow R.O.CH_2.(SCN) + KCl.$$

It has further been discovered that quaternary ammonium compounds of substances falling under the above formula can be employed for the ennoblement, particularly for rendering water-repellent textiles, especially threads, fibers, yarns, fabrics and knit goods made of cellulose or cellulose derivatives. These quaternary ammonium compounds can be formed by reaction with tertiary amines such as pyridine, in accordance with the following reaction:

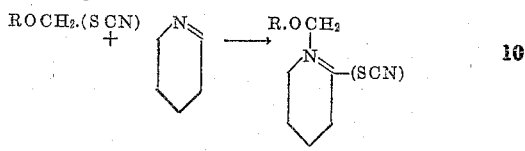

As tertiary amines used for the formation of the quaternary ammonium salts those tertiary amines are used which are sufficiently volatile, in order that they may volatilize off during the drying process. There may be employed the volatile heterocyclic bases which contain a tertiary nitrogen atom in the ring such as pyridine, quinoline and isoquinoline or homologues or substitution products thereof or aliphatic tertiary amines such as trimethylamine $(CH_3)_3N$ or triethylamine $(C_2H_5)_3N$. Material made under the formula mentioned with or without reaction with volatile tertiary amine may be employed for the ennoblement of textiles, the particular advantage of those reacted with tertiary amines being that they are water-soluble as noted. Where the chemical compound for producing water-repellence is soluble in water the ennobling process can be carried out in a particularly simple and economical manner.

These ethers and the quaternary ammonium salts formed may be applied to material such as cotton, jute, linen, hemp and various artificial silks and wool. The substances mentioned are distinguished by an extremely high activity towards textile material, particularly towards cellulose and cellulose derivatives, including cellulose films. It is necessary only to bring the textile material in contact with the substance, as by passing the textile material briefly through a solution thereof in a suitable solvent whereby the textile is impregnated therewith and thereafter subjecting it to a suitable temperature to cause an action to occur between the substance and the textile to produce water-repellence.

An action between the textile material and the treating substance occurs in accordance with my invention to produce water-repellence but I do not wish to be understood to state unqualifiably that a chemical reaction occurs between the textile material and the chemical compound employed in accordance with the invention, as I am not sure that such is the case.

Impregnation of the textile materials with the ether herein mentioned may be carried out in any desired manner, with or without the use of organic solvents, by means of emulsifying in an aqueous solution, soaking, spraying or the like. Similarly the textile materials may be treated with the quaternary ammonium salts dissolved in water, the water solution being applied to the textile in any desired manner as by soaking the textile, spraying or the like. The addition of catalytic agents for the purpose of securing the desired water-repellence may be made, but such addition is not necessary. The water-repellent effect resists domestic washing with soap. After thorough rinsing out of the soap employed in such washing, and drying, the textile material again manifests water-repellent properties. It is also resistant to dry cleaning with light benzine for example.

It is also possible in the case of acetyl cellulose to add the ethers mentioned herein to the spinning solution itself in order thus to combine the process of producing water-repellence with the spinning process. Then, too, one may treat the fibers of cellulose or cellulose derivatives immediately after the spinning process with the ethers herein mentioned, to obtain water-repellence. Similarly the quaternary ammonium salts of the ethers may be employed in solution with the acetyl cellulose spinning solutions or the fibers of cellulose or cellulose derivatives may be treated by an aqueous solution immediately after the spinning process to obtain water-repellence.

Textiles treated with the ethers or the quaternary ammonium salts as herein described should be heated for a short time, for example at temperatures preferably above 100° C., to cause water-repellence.

The following are examples of embodiments of the invention as I now prefer to carry it out. It is to be understood that the invention is not limited to the examples given, except as indicated in the appended claims:

*Examples*

1. A raincoat material, having spun viscose rayon as warp and weft, is passed through a 1% solution of thiocyanomethyl octadecyl ether $C_{18}H_{37}.O.CH_2.(SCN)$ in benzine. The time of passage is about 3 seconds and the solution is at room temperature. After evaporating off the benzine the material is heated for 5 minutes to 140° C. (284° F.). The material then becomes water-repellent. The effect is proof to washing with soap, as well as to the solvents customary in dry cleaning.

2. A fabric consisting of spun viscose rayon is treated with a 1% solution of thiocyanomethyl sterol ether $C_{27}H_{45}O.CH_2.(SCN)$ as described in Example 1.

3. A poplin from mercerized cotton, suitable for rainproof overcoats is passed through a 1% solution of thiocyanomethyl hexadecyl ether $C_{16}H_{33}O.CH_2.(SCN)$ in benzine. The solvent is then removed by heating the fabric to about 100° C. for a short time, afterwards the material is exposed for 60 minutes to a temperature of 100° C.

4. A wool muslin is treated with a 0.5% solution of thiocyano methyl docosyl ether $$C_{22}H_{45}O.CH_2.(SCN)$$

in benzine. The solvent is then removed by heating the fabric to about 100° C. for a short time, afterwards the material is exposed for 60 minutes to a temperature of 100° C.

5. A raincoat material of mercerized cotton is soaked in a water solution containing 10 grams per liter of octadecyl oxymethyl pyridine thiocyanate having the formula

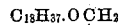
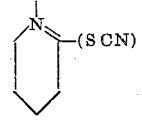

at a bath-temperature of about 60° C. for 10 minutes. After the drying has taken place the material is preferably heated for several hours at 90° C. The material shows a permanent water-repelling effect. The fibers of the cotton so treated (and the same is true where the fibers are not previously mercerized) are not only rendered water-repellent but become less capable of swelling in the presence of swelling agents and have a greatly increased resistance to wetting.

6. Undyed, unbrightened, loose spun rayon is introduced into an aqueous bath heated to about 60° C. containing per liter 5 grams of octadecyloxymethyl pyridine thiocyanate

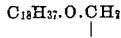
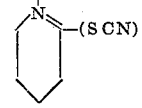

The spun rayon remains for about 15 minutes in this bath, is then removed, centrifuged and dried at 90° C. After the drying has taken place the spun rayon is preferably heated for several hours at 90° C. The spun rayon which has been treated in this way shows a water-repellence which resists washing with soap and water and also resists dry-cleaning by benzine. In the presence of soap or other wetting agents the water-repellent material so produced may be dyed hot; after thorough rinsing of the wetting agent or soap the water-repellent effect reappears.

Other substances falling under the general formula for the ethers and quaternary ammonium salts thereof which may be utilized in a similar way include the following: thiocyanomethyl ether of octadecandiol $C_7H_{14}(OH)C_{11}H_{22}.O.CH_2.(SCN)$ thiocyanomethyl ether of bicyclic naphthenic alcohol $C_{17}H_{31}.O.CH_2.(SCN)$.

The following are examples of processes for the manufacture of ethers described in the above examples. Other similar ethers may be similarly prepared and the invention is not to be limited to the following examples except as indicated in the appended claims:

7. 318 grams of octadecylchlormethyl ether $C_{18}H_{37}.O.CH_2.Cl$ prepared by reaction of octadecyl alcohol with trioxymethylene and dry hydrochloric acid gas are heated with 110 grams of potassium sulphocyanate in xylol solution for 10 hours at the reflux condenser to 140° C. The solution of the thiocyanomethyl octadecyl ether which results is separated from the mass and the solvent distilled off. The resulting thiocyanomethyl octadecyl ether is a waxy mass, solid at ordinary temperature. It has a formula represented by the following: $C_{18}H_{37}.O.CH_2.(SCN)$.

8. 380 grams of a technical sterol mixture obtained from the unsaponifiable part of wool fat are dissolved in 3 liters of benzol and are treated with 30 grams of trioxymethylene, and dry hydrogen chloride is led thereinto. The chlormethyl ether of sterol results, having the formula: $C_7H_{45}O.CH_2.Cl$. The resulting solution of the chlormethyl ether of sterol is separated from the reaction water, dried with calcium chloride and the solvent removed by distillation. The chlormethyl ether is then heated in xylol for 10 hours at the reflux condenser to 140° C. with a calculated quantity of potassium sulphocyanate—1 mol potassium sulphocyanate to 1 mol chlormethyl ether. The solution of the thiocyanomethyl sterol which results is separated from the mass and the solvent distilled off. The resulting thiocyanomethyl sterol is a waxy mass, solid at ordinary temperature. It has a formula represented by the following: $C_7H_{45}O.CH_2.(SCN)$.

9. 318 grams of octadecylchlormethyl ether are mixed with 200 grams of potassium sulphocyanate without the employment of organic or other solvents. The mixture is then heated to 180° C. for 1½ hours. The thiocyanomethyl octadecyl ether which results is separated from the mass.

10. 318 grams of octadecylchlormethyl ether are mixed with 200 grams of water free calcium sulphocyanate without the employment of organic or other solvents. The mixture is then heated to 180° C. for 1½ hours. The thiocyanomethyl octadecyl ether which results is separated from the mass.

11. 300 grams of alpha-thiocyanic methyl octadecyl ether $C_{18}H_{37}.O.CH_2.(SCN)$ are stirred 20 minutes at a temperature of 110° C. with 100 grams of waterfree pyridine. There is formed octadecyl oxymethyl pyridine thiocyanate. In order to remove impurities formed during the reaction process the quaternary ammonium salt must be purified by treatment with an organic solvent such as benzine. By this treatment with benzine dark colored impurities are dissolved and the pure octadecyl oxymethyl pyridine thiocyanate remains. The product is then separated from the benzine solution by filtration and dried. After drying the product is clearly soluble in water and may be utilized as indicated above.

The amount of the ether deposited in all of the above examples 1 to 5 on the materials will naturally vary with the weight of the material and its reactability. I have found that ordinarily an amount of the ether equal to about 1% of the material is sufficient to give the effect. The amount of the quaternary ammonium salt deposited in this manner is about 1-2% of the material to give the desired effect.

The materials produced in accordance with the above examples show a high degree of water-repellence. They show a lesser absorption of moisture as compared with the known textiles treated with fatty acid chlorides and fatty acid anhydrides. They show also greatly improved durability toward dry cleaning with benzine, and soap washing, as compared with these previous materials. The feel and hang of the materials having water-repellence as produced above is not substantially altered.

The process of the invention, particularly as set forth in the specific embodiments above, may be carried out with simple apparatus at relatively small expense and in a relatively short time.

The expression "aralkyl" as employed in the appended claims, shall be understood to mean an alkyl radical in which one of the hydrogen atoms has been replaced by an aryl radical or a cyclo radical containing an alkyl radical, respectively.

The expression "cellulosic material" as used in the claims shall be understood to mean cotton, artificial silk including viscose, cuprammonium and acetyl cellulose, linen, jute or like materials employed as yarn, thread, fabric or the like. The expression "textile material" as herein employed shall be understood to include "cellulosic material" as above defined, as well as material such as wool employed as yarn, thread, fabric, or the like.

Matter disclosed but not claimed herein is claimed in copending application Serial No. 267,318, filed April 11, 1939.

While the invention has been described in detail according to the preferred manner of carrying out the process, it will be obvious to those skilled in the art after understanding the invention, that changes and modifications may be made therein without departing from the spirit or scope of the invention, and it is intended in the appended claims to cover all such changes and modifications.

What is claimed as new and desired to be secured by Letters Patent, is:

1. A process for ennobling textile material which comprises treating the material with a substance containing a compound having the formula $R.O.CH_2.(SCN)$ in which R is an alkyl, cycloalkyl or aralkyl radical containing an alkyl group having at least 10 carbon atoms or is a saturated or unsaturated radical of an alcohol of the sterol group, and heating the so treated material to increase the water-repellence.

2. A process for ennobling textile material which comprises treating the material with a substance, containing a material having the formula $$\begin{array}{c} R.O.CH_2 \\ | \\ NX.(SCN) \end{array}$$

in which R is an alkyl, cycloalkyl or aralkyl radical containing an alkyl group having at least 10 carbon atoms or is a saturated or unsaturated radical of an alcohol of the sterol group, and NX stands for a volatile tertiary amine and heating the so treated material to increase the water-repellence.

3. A process for ennobling textile material which comprises treating the material with an thiocyanic ether having the formula $$R.O.CH_2.(SCN)$$

in which R is an alkyl, cycloalkyl or aralkyl radical containing an alkyl group having at least 10 carbon atoms or is a saturated or unsaturated radical of an alcohol of the sterol group, capable of acting with said material to increase the water-repellence thereof and heating the so-treated material to increase the water-repellence.

4. A process for ennobling textile material which comprises treating the material with a thiocyanic methyl ether containing a saturated alkyl radical of at least 10 carbon atoms and heating the so treated material to increase the water-repellence.

5. A process for ennobling textile material which comprises treating the material with a thiocyanic methyl ether containing a radical of an alcohol of the sterol group having at least 10 carbon atoms and heating the so treated material to increase the water-repellence.

6. A process for ennobling artificial silk which comprises subjecting the artificial silk for a short period of time at a temperature above 100° C. to action with a thiocyanic ether having the formula $R.O.CH_2.(SCN)$ in which R is an alkyl, cycloalkyl or aralkyl radical containing an alkyl group having at least 10 carbon atoms, capable of acting with said artificial silk to increase the water-repellence of said silk.

7. A process for ennobling artificial silk which comprises subjecting the artificial silk to a solution of thiocyanomethyl octadecyl ether, and subjecting the silk to a temperature of about 140° C. for about 5 minutes to increase the water-repellence of said silk.

8. A process for ennobling artificial silk which comprises subjecting the artificial silk to a solution of thiocyanomethyl sterol ether, and subjecting the silk to a temperature of about 140° C. for about 10 minutes to increase the water-repellence of said silk.

9. A process according to claim 2 in which a cellulosic material is subjected to a quaternary ammonium salt therein mentioned and is then heated to a temperature of about 80–100° C. for about two hours to increase the water-repellence of said cellulosic material and to drive off the free tertiary amine produced.

10. A process according to claim 2 in which a cellulosic material is subjected to a water soluble quaternary pyridinium salt therein mentioned and is then heated to a temperature of about 80–100° C. for about two hours to increase the water-repellence of said cellulosic material and to drive off the free pyridine produced.

ERNST WALTMANN.

Certificate of Correction

Patent No. 2,220,856.

November 5, 1940.

ERNST WALTMANN

It is hereby certified that error appears in the printed specification of the above numbered patent requiring correction as follows: Page 1, second column, line 8-14, and page 2, second column, line 7-12 and line 28-33, in the formula, for

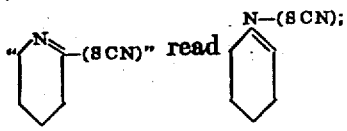

and that the said Letters Patent should be read with this correction therein that the same may conform to the record of the case in the Patent Office.

Signed and sealed this 9th day of September, A. D. 1941.

[SEAL]

HENRY VAN ARSDALE,
*Acting Commissioner of Patents.*